United States Patent [19]

Kalmanson

[11] Patent Number: 5,078,418
[45] Date of Patent: Jan. 7, 1992

[54] TOWING HEAD ASSEMBLY

[76] Inventor: William Kalmanson, 7531 Center Bay Dr., North Bay Village, Fla. 33141

[21] Appl. No.: 527,294

[22] Filed: May 23, 1990

[51] Int. Cl.$^5$ .............................................. B60D 1/28
[52] U.S. Cl. ................................ 280/506; 280/451; 280/504; 180/904
[58] Field of Search ............... 280/504, 507, 506, 513, 280/515, 451, 432, 449, 450, 455.1, 457, 410, 455, 510; 180/904; 403/93, 95, 96

[56] References Cited

U.S. PATENT DOCUMENTS

| | | | |
|---|---|---|---|
| Re. 14,582 | 1/1919 | Cadman | 280/506 |
| 1,342,593 | 6/1920 | Orr | 403/92 |
| 1,419,398 | 6/1922 | Mason | 280/515 |
| 2,468,669 | 4/1949 | Holmes | 280/451 |
| 2,475,780 | 7/1949 | Fearnehough | 280/513 |
| 2,665,128 | 1/1954 | Guffey | 280/451 |
| 2,998,268 | 8/1961 | Witter | 280/506 |
| 3,580,612 | 5/1971 | Pearson | 280/432 |
| 4,418,936 | 12/1983 | Adams | 280/504 |
| 4,426,098 | 1/1984 | Kalmanson | 280/504 |

FOREIGN PATENT DOCUMENTS

| | | | |
|---|---|---|---|
| 0472034 | 3/1951 | Canada | 280/504 |
| 3705740 | 10/1987 | Fed. Rep. of Germany | 180/904 |
| 8801287 | 12/1989 | Netherlands | 280/504 |
| 2050977 | 1/1981 | United Kingdom | 280/451 |

Primary Examiner—Charles A. Marmor
Assistant Examiner—Anne Marie Boehler
Attorney, Agent, or Firm—Malloy, Downey & Malloy

[57] ABSTRACT

A towing head assembly, designed to be mounted on a tow bar of a towing vehicle, which is structured to innerconnect the towing vehicle to a tow pin of the type normally found on aircraft landing gear. A connecting structure includes a rotatable cam selectively positionable into a clamping or locking position defined by camming engagement of a cam structure with the tow pin of the aircraft forcing it to be clamped between a remainder of the mounting structure such as one or more hook members. The cam structure includes an adjusting feature which adjustably forces a portion thereof into camming engagement with the tow pin so as to overcome wear of the tow pin and ensure a firm, clamping engagement therewith.

8 Claims, 2 Drawing Sheets

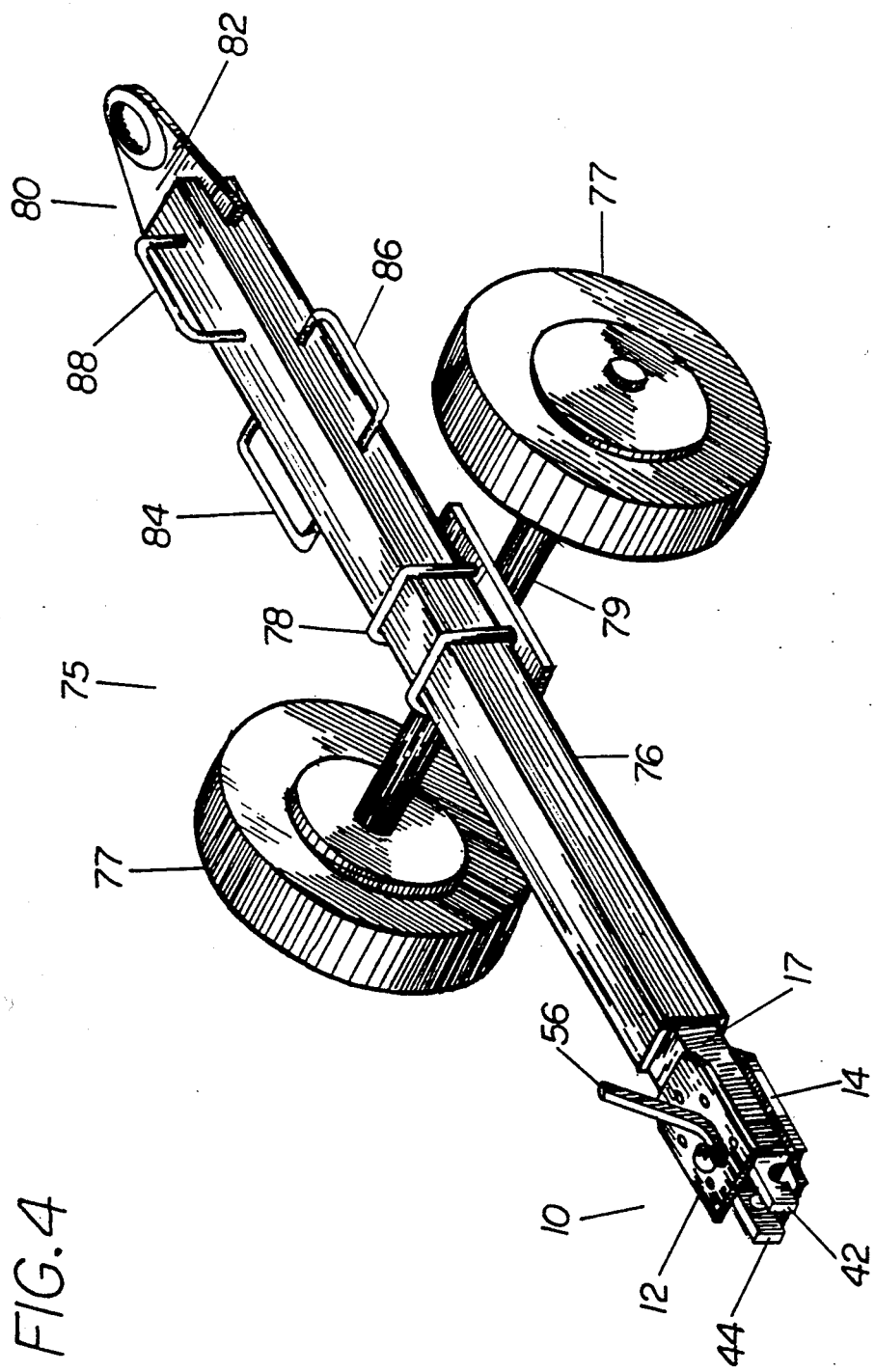

5,078,418

TOWING HEAD ASSEMBLY

BACKGROUND OF THE INVENTION

1. Field of the Invention

This invention relates to a towing head assembly mounted on the tow bar of a towing vehicle and being specifically adapted to engage and innerconnect the landing gear of aircraft to the towing vehicle for movement and travel of the aircraft to an intended location.

2. Description of the Prior Art

U.S. Pat. No. 4,426,098 to Samuel Kalmanson, is directed to a head assembly for a towing device for use in connecting a tow bolt of an aircraft landing gear to a towing vehicle. The assembly of the above-noted invention includes a body having a central operating opening therethrough and a communicating downwardly opening recess for hooked-up engagement with the towing bracket of the aircraft. A cam member is swingable or rotatably carried in the operating chamber with a portion thereof adapted for rotation into and out of closing relation of the downwardly facing recess to captivate a towing bracket of an aircraft. Towing head assemblies of the type set forth in the above-noted patent are designed to accomplish a secure clamped engagement with the towing bracket or tow pin associated with the landing gear of the aircraft and the towing vehicle. This is done to accomplish towing travel of the aircraft while ensuring damage is not done to the aircraft landing gear or any other portion thereof. While the structure disclosed in the above-noted Kalmanson patent is operable and efficient for its intended function, the present invention as described in greater detail hereinafter, constitutes an improvement thereof. More specifically, one common problem associated with towing aircraft utilizing head assemblies and towing vehicles of the type set forth herein is the normal wear and tear and the resulting deterioration in size and/or shape of the tow pin mounted on the landing gear of the aircraft. It is important that a firm gripping engagement occur between the towing head and the bracket regardless of the degree of wear or change in dimension or configuration, due to wear, such bracket or tow pin may have undergone.

Accordingly, there is a need in this industry for a towing head assembly having an adjustable feature thereon. A cam portion of a preferred structural embodiment may have an adjusting feature thereon such that an engaging, camming and clamping surface may effectively be regulated in its position relative to the tow pin to ensure a firm grasping engagement of the confronting surface of the cam member with the tow pin. This will ensure the tow pin being removably clamped in a reliable manner between such adjustable camming surface and a remainder of the tow head serving to grip the tow pin of the aircraft.

SUMMARY OF THE INVENTION

The present invention relates to a towing head assembly. The towing head assembly includes a body having a base and two elongated spaced apart and substantially parallel plates connected to the base by a mounting means. The mounting means includes a shear pin extending transversely through each of the plates and through an opening formed in the base of the body. The mounting means also includes a safety bolt having opposite ends connected to the plates in a similar manner as the aforementioned shear bolt but also extending transversely through a leading portion of a tow bar or a connecting member itself being attached to the tow bar.

The body of the towing head assembly also includes a connecting means which is positioned at what may be considered a leading end of the body of the towing head. The connecting means includes two spaced apart hooks which are designed to hook over and partially surround what may be considered an upper side or surface of a tow pin or tow bracket. The tow pin or tow bracket is attached to the landing gear or other appropriate parts of an aircraft or other vehicle to be towed. An important feature of the present invention is the provision of a camming structure also defining a part of the connecting means. The camming structure includes a cam member fixed to a cam shaft wherein the cam shaft and cam member are rotatably mounted on the body of the towing head. The cam shaft has a sufficiently elongated configuration to have its opposite ends extend through and be rotatably connected to the opposed plates as set forth above.

An operating handle or positioning means is connected to one end of the cam shaft and such connection allows the rotation of the cam shaft upon manipulation of the outwardly extending, exteriorally exposed handle. A stop means in the form of a spring loaded detent or like structure is mounted on the handle. The various positions of the handle on the exposed surface of a topmost one of the opposed plates may be maintained by the spring biased detent engaging a plurality of spaced apart recesses formed in the outer exposed surface of the plate.

The cam structure includes a cam base and adjustment means secured thereto. This adjustment means comprises an outwardly extending flange spaced from a lower end or base portion of the cam member. An adjuster member is threaded to the base and rotatable relative thereto. Manipulation, as by rotation of the adjuster member relative to the base portion of the cam, serves to regulate the position of the outwardly extending flange and more particularly, the engaging, camming surface thereof relative to its engagement with the tow pin.

As set forth above, the cam structure including the adjustable flange is rotatable into and out of a locked or clamped position. When so positioned, the exposed camming surface on the adjustable flange, engages generally an under surface of the tow pin. The aforementioned hooks comprising the remainder of the mounting means will be hooked over substantially the upper surface of the tow pin. This serves to removably clamp, in a reliable fixed engagement, the tow pin between the hooks on its upper surface and the adjustable flange on its lower surface. When disconnection is required, the handle is manipulated serving to rotate both the cam shaft and the cam member thereby forcing the cam surface and the adjustable flange out of camming engagement with an under portion of the tow pin. The hooks may be removed from their hooked engagement with the tow pin and the tow bar and head assembly may be entirely disconnected.

After a period of time, wear of the tow pin becomes evident. This wear manifests itself in the form of a reduction in size and/or change in configuration of the tow pin where camming engagement between the cam structure and the tow pin occurs. Previously, a plurality of washers, shims, or like additional auxiliary structures were added so as to overcome such deformation of the tow pin. The present invention comprises preferably an integral, one-piece construction of the adjustable flange. Manipulation of the aforementioned adjuster member will force the adjustable flange into a displacement which is closer to the under side of the tow pin. This will serve to accommodate any reduction in size of the tow pin, due to wear or deformation of the configuration thereof. Such movement or displacement of the adjustable flange occurs due to the fact that the outermost end of the adjustable member is forced into abutting, driving engagement with a flange. The adjuster member, therefore, is rotatably and/or threadedly attached to the base portion of the cam and extends across the space between the adjustable flange and the base portion into driving, displacing engagement with the adjustable flange.

Other features of the tow head assembly include the provision of anti-jack-knife means which prevents a skewed or extreme angular orientation of the tow pin relative to the head or plates of the body of the towing head in the event that the shear pin breaks due to excessive force being exerted thereon. In the event that the shear pin does break, the only connection existing between the tow bar and the head will be through the transverse orientation and interconnection of the safety bolt. The safety bolt is made from an extremely high strength material which will resist breaking under any foreseeable condition. This material is preferably heat treated steel and is much stronger and much more resistant to such shearing or breaking than that of the shear pin. The shear pin is, in fact, designed to shear or break when certain excessive forces are exerted thereon such as when the towing vehicle exerts an excessive pushing or pulling force on the body of the towing head during the towing of the aircraft or like vehicle. The provision of the shear pin will prevent damage being done to the landing gear or other portions of the aircraft to which the tow pin is attached.

The aforementioned anti-jack-knife means includes two anti-jack-knife pins each having their opposite ends secured to their spaced apart plates defining the body of the towing head. These pins are located exteriorally on opposite sides of the tow bar but in interruptive engagement therewith if the tow bar has a tendency to be skewed or assume an excessive angular orientation relative thereto.

BRIEF DESCRIPTION OF THE DRAWINGS

For a fuller understanding of the nature of the present invention, reference should be had to the following detailed description taken in connection with the accompanying drawings, in which:

FIG. 4 is a perspective view of a tow bar with the head assembly of the present invention attached thereto.

Like reference numerals refer to like parts throughout the several views of the drawings.

DETAILED DESCRIPTION OF THE PREFERRED EMBODIMENT

Figure 1:
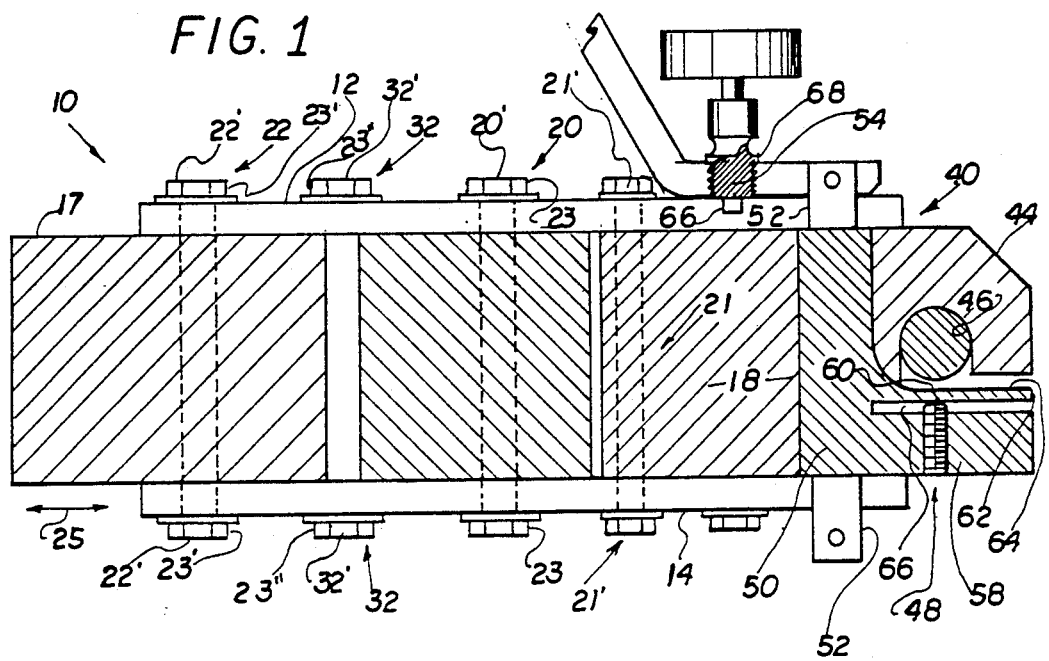
FIG. 1 is a longitudinal sectional view of the towing head assembly of the present invention.
Figure 2:
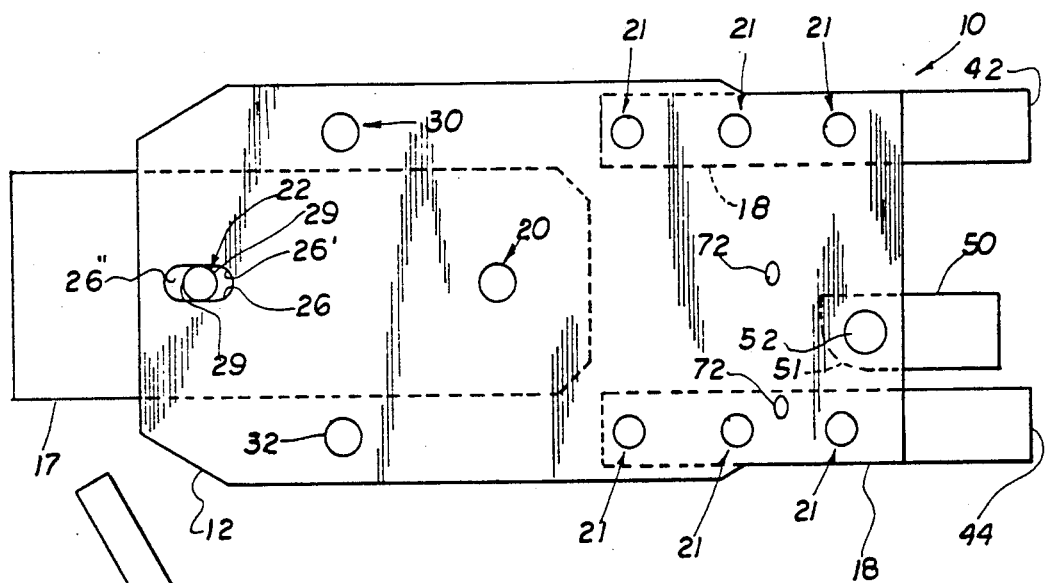
FIG. 2 is a top view in partial phantom of the towing head assembly of the embodiment of FIG. 1 in partially disassembled form.

As shown in FIGS. 1 and 2, the present invention is directed towards a towing head assembly generally indicated as 10 and comprising a towing body defined by two spaced apart opposed plates 12 and 14 connected together by what may be considered a base portion 18. A plurality of attachment bolts and/or pins generally indicated as 21 have sufficient length to be connected at their opposite ends 21' to the plates 12 and 14 as shown. In addition, a tow bar 17 is also attached to the plates by a mounting means. The mounting means comprises at least one shear bolt generally indicated as 20 and having a sufficient length to have its opposite ends connected to each of the plates 12 and 14 as at 20' by connectors 23. In addition, the aforementioned mounting means includes a safety bolt generally indicated as 22. The safety bolt also extends vertically as does the shear bolt 20, through both the plates 12 and 14 and through the tow bar 17. The opposite ends as at 22' are connected by a similar type of connectors as at 23'. The shear bolt is made from a metallic material of specific strength. More specifically, the shear bolt is dimensioned and configured so as to shear or break transversely if excessive force either in a pushing or pulling direction as indicated by directional arrow 25 is exerted on the body of the tow head assembly or more specifically the plates thereof by the towing vehicle which is attached to the tow bar 17. To the contrary, the safety bolt 22 is formed of an extremely high strength material and will resist breaking or shearing under any normally excessive forces exerted on the assembly 10 by the tow bar 17. The breakage or shearing of the shear bolt or pin 20 is allowed so as to prevent any damage being done to the landing gear or other portions of the vehicle to which a tow pin or bracket is attached. With reference to FIG. 2, it is noted that the safety bolt 22 passes through an elongated receiving aperture 26 formed in each of the plates 12 and 14. The length of the elongated aperture 26 is such that the distance between the outermost surface of the safety bolt as at 29 is spaced from the corresponding end of the aperture 26' or 26" a distance at least equal to the diameter of the shear bolt 20. This is to accommodate any movement of the tow bar 17 relative to the plates 12 and 14 upon a shearing of the bolt 20.

Other features associated with the mounting means but not considered necessarily a direct portion thereof is the provision of an anti-jack-knife means. Such anti-jack-knife means in the form of two anti-jack-knife pins 30 and 32 mounted exteriorally of and on opposite sides of the tow bar 17 but having the opposite ends thereof as at 32', respectively, attached to the plates 12 and 14 by a conventional type connector as at 23". The positioning of the anti-jack-knife pins or bolts is such as to be positioned in abutting relation with the corresponding and spaced apart side of the tow bar 17. Upon a shearing of the shear bolt 20, the tow bar 17 may have a tendency to skew or assume an excessive angular orientation relative to the plates 12 and 14. However, the anti-jack-knife pins will abutt against the correspondingly positioned side thereby preventing such skewing or excessive angular orientation and further prevent any "jack-knife" type of event in the event the shear pin 20 does, in fact, break.

Another feature of the present invention is the provision of a connecting means generally indicated as 40. The connecting means includes two spaced apart hook members 42 and 44 which may be considered part of the base portions of the body as at 18 (see FIGS. 1 and 2) wherein the hooks 42 and 44 extend outwardly from a leading end of the tow head assembly. The hooks have aligned recesses as at 46 dimensioned to fit over and assume a hooked-up connection as pictured in FIG. 1 about what may be considered an upper surface of the tow pin shown in the recesses 46 in FIG. 1. In order to ensure this hooked engagement between the hooks 42 and 44 and the tow pin, a cam structure generally indicated as 48 is rotatably mounted on the plates 12 and 14 relative to the hooks 42 and 44 and the top pin. The cam structure generally indicated as 48 includes a cam member 50 secured to a cam shaft 52 and rotatable therewith relative to the plates 12 and 14. The upper end of the cam shaft 52 is secured to a positioning means in the form of an outwardly extending handle generally indicated as 56 in FIG. 3. The handle is rotatable relative to plate 12 along with the cam shaft 52 thereby causing both the cam shaft 52 and the cam member 50 attached thereto to be selectively positioned into and out of a clamping or locked position, see FIG. 1. When in locked position, the cam member 50 will confrontingly engage and be brought into camming contact with what may be considered an under portion of the tow pin thereby removably locking it into the hooked engagement with the hooks 42 and 44. An important feature of the present invention is the existence of an adjustment means comprising an adjuster member 60 being externally threaded and accordingly movable about its own longitudinal axis relative to a cam base 58. The free end or upper end of the adjuster member 60 is disposed into abutting and driving engagement with an undersurface of an outwardly extending adjustable flange 62. The flange has an outer exposed camming surface 64 which effectively engages the under portion of the tow pin in a camming action thereby defining the clamped position as set forth above. A space exists as at 66 between the base portion 58 of the cam member 50 and the outwardly extending flange 64. This existing space and the reduced thickness of the flange 64 gives it certain flexibility and allows the adjuster member 60 to cause the displacement of the flange 62 towards the tow pin. Such displacement is necessary when wear or deformation of the tow pin 28 occurs and/or wear or deformation of the camming surface 64 occurs due to excessive wear thereon.

Other features of the present invention include a rounded portion as at 51 formed on the cam member 50 which allows the cam 50 to be rotated or pivoted about the cam shaft 52 into a non-locking position by manipulation of the handle 56.

Figure 3:
FIG. 3 is a detailed view of one component of the towing head assembly.

Yet another feature of the present invention includes a stop means or auto lock member including a spring biased or loaded detent 66 protruding outwardly from the body of a lock member 68 which is screw threaded or otherwise attached to the handle 56 by extending through an aperture 68 formed in the head portion of the handle 56 see FIG. 3. Similarly, the upper end of the cam shaft 52 passes through another appropriately formed and disposed aperture 70 and the head portion of the handle 56 as best shown in FIGS. 2 and 3. The spring loaded detent as at 66 will cooperate with a plurality of indentations or recesses 72 formed in the outer surface of the plate 12, see FIG. 2, wherein the engagement of the detent 66 with any of the recesses 72 will cause its maintenance either into or out of the aforementioned locked position as should be evident.

As shown in FIG. 4, a carriage assembly generally indicated as 75 is used to mount the tow bar as at 17 and includes a wheel and axle structure including two spaced apart wheels 77 interconnected by an axle 79 which is connected to a casing member 76 in which the tow bar 17 is mounted. A support or connecting bracket assembly as at 78 is used to attach the axle and wheel 79 and 77, respectively, to the casing 76 so as to allow free movement of the entire carriage assembly 75 with the tow head assembly 10 attached thereto. The opposite end as at 80 includes a connecting bracket or structure 82 which is attachable directly to a hitch or like member of a towing vehicle of a type commonly used in the airline industry.

Other gripping and handling brackets or handles as at 84, 86 and 88 are provided in various locations so as to allow the manipulation and proper positioning of the entire carriage assembly 75 as required for attachment to the airplane and the towing vehicle.

Now that the invention has been described,
What is claimed is:

1. A towing head assembly attached to a towing vehicle and designed to be connected to a tow pin mounted on a vehicle to be towed, said tow pin having an upwardly facing surface and a downwardly facing surface, said assembly comprising:
   a. a body including a mounting means secured thereto and structurally adapted for mounting to a tow bar of the towing vehicle;
   b. connecting means mounted on said body in spaced relation to said mounting means and structurally adapted for removably connecting the tow pin to said body and the tow bar of the towing vehicle attached to said body,
   c. said connecting means comprising a cam structure rotatably mounted on said body and selectively positionable into and out of a locking position defined by camming engagement with the downwardly facing surface of said tow pin,
   d. said locking position further defined by said cam structure and by said connecting means disposed in clamping engagement on the upwardly facing surface of the tow pin, outboard of and or opposite sides of said cam structure
   e. said cam structure comprising a cam member and adjustment means on said cam member and movable therewith into and out of said locking position, said adjustment means structured for regulating caming force applied to the tow pin,
   f. positioning means connected to said cam structure and movably mounted on said body in an exteriorly accessible location for moving said cam structure into and out of said locking position;
   g. said cam structure further comprising a cam shaft fixedly connected to said cam member and rotatably mounted therewith on said body, said positioning means attached to said cam shaft and structured for rotation thereof with said cam member into and out of said locking position;
   h. said positioning means comprising a handle attached to said cam shaft and rotatable therewith and a stop means connected to said handle and structure for maintenance of said handle in any one of a plurality of positions on said body;
   i. said connecting means comprising a hook assembly disposed and dimensioned to engage the upwardly facing surface of the tow pin and said cam structure movable into caming and clamping engagement with the downwardly facing surface of the tow pin;
   j. said hook assembly comprising two spaced apart hooks disposed in overlapping engagement with said upwardly facing surfaces of said tow pin, said cam structure movably mounted between said two hooks and rotatable into and out of caming and clamping engagement with the downwardly facing surface of the tow pin relative to said two hooks;

k. said adjustment mean comprises a tow pin engaging portion on said cam member and movable in a direction towards the tow pin when said cam structure is in locking position;

l. said adjustment means including an adjuster member movably mounted on said cam structure and selectively positionable outwardly therefrom into abutting, movable engagement with said tow pin engaging portion;

m. said tow pin engaging portion comprising an outwardly extending flange mounted on said cam structure in spaced relation to a base portion thereof, said adjuster member movably connected to said base portion and extending outwardly therefrom into abutting, driving engagement with said flange, said flange and said adapter member cooperatively adapted to bias said flange toward the tow pin when in said locking position; and n. said adjuster member comprising an externally threaded member rotatably mounted in threaded engagement with said base portion and having one end disposed in forced, abutting engagement with said flange, said threaded member adapted for longitudinal, axial positioning, and forced movement of said flange towards the tow pin.

2. An assembly as in claim 1 wherein said stop means comprises a spring loaded detent structure mounted on said handle and disposed in engaging relation with each of a plurality of recesses formed in spaced relation to one another on said body, each of said recesses defining one of said plurality of positions.

3. An assembly as in claim 1 wherein said body comprises two mounting plates connected to opposite sides of a base portion of said body.

4. An assembly as in claim 3 wherein said mounting means comprises a shear pin having opposite ends connected to said plates and extending vertically through the tow bar, said shear pin structured to break upon a predetermined excess pressure applied thereto through said bar.

5. An assembly as in claim 4 wherein said mounting means further comprises a safety bolt structured to be more resistant to breakage than said shear pin and having opposite ends connected to said plates and extending in vertical relation through the tow bar in spaced relation to said shear pin.

6. An assembly as in claim 5 wherein said safety bolt has each of its opposite ends extending through elongated slots formed in each of a different one of said plates, said elongated slots being of sufficient dimension to allow travel of the safety bolt ends therein in each of two opposite directions a distance at least equal to a diametrical dimension of said shear bolt.

7. An assembly as in claim 4 further comprising anti-jack-knife means formed on said body between said plates and on opposite sides of the tow pin mounted therebetween.

8. An assembly as in claim 7 wherein said anti-jackknife means comprises two elongated pins having opposite ends connected to said plates and extending vertically therebetween relative to a length of the tow bar and disposed exteriorally thereof on opposite sides of the tow bar.

* * * * *